(12) United States Patent
Ott (10) Patent No.: US 11,360,040 B2
(45) Date of Patent: Jun. 14, 2022

(54) DEVICES AND METHODS FOR CAPACITIVE FOAM DETECTION IN LIQUID CONTAINERS

(71) Applicant: TECAN TRADING AG, Mannedorf (CH)

(72) Inventor: Philipp Ott, Steg (CH)

(73) Assignee: TECAN TRADING AG, Mannedorf (CH)

( * ) Notice: Subject to any disclaimer, the term of this patent is extended or adjusted under 35 U.S.C. 154(b) by 0 days.

(21) Appl. No.: 17/258,370

(22) PCT Filed: Jul. 9, 2019

(86) PCT No.: PCT/EP2019/068387
§ 371 (c)(1),
(2) Date: Jan. 6, 2021

(87) PCT Pub. No.: WO2020/011776
PCT Pub. Date: Jan. 16, 2020

(65) Prior Publication Data
US 2021/0293738 A1  Sep. 23, 2021

(30) Foreign Application Priority Data
Jul. 13, 2018 (EP) ..................................... 18183381

(51) Int. Cl.
*G01N 27/22* (2006.01)
*G01F 23/263* (2022.01)

(52) U.S. Cl.
CPC ......... *G01N 27/226* (2013.01); *G01F 23/265* (2013.01)

(58) Field of Classification Search
CPC .... G01N 27/226; G01F 23/265; G01F 23/266
See application file for complete search history.

(56) References Cited

U.S. PATENT DOCUMENTS

| 7,509,856 B1* | 3/2009 | Winkens | G01F 23/265 |
| | | | 73/304 C |
| 2005/0194250 A1* | 9/2005 | Frey | C12Q 1/6837 |
| | | | 204/403.01 |

(Continued)

FOREIGN PATENT DOCUMENTS

| DE | 19949985 A1 | 5/2001 |
| DE | 102017128166 A1 | 5/2018 |

(Continued)

OTHER PUBLICATIONS

International Preliminary Report on Patentability and Written Opinion for corresponding PCT application No. PCT/EP2019/068387, dated Jan. 19, 2021.

(Continued)

*Primary Examiner* — Alvaro E Fortich
(74) *Attorney, Agent, or Firm* — Notaro, Michalos & Zaccaria P.C.

(57) ABSTRACT

Devices and corresponding methods for capacitive foam detection in liquid containers are disclosed. The device has a sensor with a measurement electrode having a plurality of sub-electrodes, a bottom plate that is used as a counter electrode for arranging a liquid container, a sensor electronic unit that is connected to the measurement electrode and the bottom plate and is adapted to determine an impedance, in particular a capacitance, between the measurement electrode and the bottom plate, and an evaluation unit, the measurement electrode being arranged substantially perpendicularly to the bottom plate.

25 Claims, 8 Drawing Sheets

(56) References Cited

U.S. PATENT DOCUMENTS

| | | | | |
|---|---|---|---|---|
| 2011/0239757 A1* | 10/2011 | Camenisch | ............ | G01F 23/268 |
| | | | | 73/304 C |
| 2016/0025546 A1* | 1/2016 | Ott | ......................... | G01F 23/266 |
| | | | | 73/304 C |
| 2016/0356737 A1* | 12/2016 | Schoeni | .................. | G01N 27/22 |
| 2017/0345141 A1* | 11/2017 | Vivet | ................. | G01N 35/1016 |

FOREIGN PATENT DOCUMENTS

| | | |
|---|---|---|
| EP | 1860409 A1 | 11/2007 |
| EP | 2977730 A1 | 1/2016 |

OTHER PUBLICATIONS

International Search Report for corresponding PCT application No. PCT/EP2019/068387, dated Sep. 13, 2019.

* cited by examiner

DEVICES AND METHODS FOR CAPACITIVE FOAM DETECTION IN LIQUID CONTAINERS

TECHNICAL FIELD OF THE INVENTION

The present invention belongs to the technical field of automated laboratory systems or equipment, such as medical, chemical, pharmaceutical or forensic analysis devices, and specifically relates to liquid processing systems, in particular devices and corresponding methods for capacitive foam detection (i.e. capacitively detecting foam) in liquid containers.

BACKGROUND OF THE INVENTION

Whenever large quantities of samples have to be examined in medical, chemical, analytical, pharmaceutical or forensic laboratories, automated laboratory systems or equipment are usually used today, which enable each individual sample to be processed quickly and reliably. Such laboratory systems are often designed as liquid processing systems to handle liquid volumes. Usually one or more robots are used for the fully automated operation of such laboratory systems. These robots are particularly specialized in handling liquid containers and are therefore referred to as "liquid handling robots" in technical jargon. The samples are usually delivered in sample containers, such as sample tubes, several of which are arranged in a carrier unit (also called "rack" in technical jargon). In addition, reagents, which are added to the samples in the course of sample processing, are often provided in vessels such as vials or troughs.

Sample tubes and reagent vessels typically have varying levels or are sometimes empty when they are prepared for processing by the liquid processing system. In addition, foam may form on the surface of the liquid when the sample tubes and reagent containers are prepared for processing. To ensure fast and efficient processing, the fill level of each liquid container should be known before the robot starts working. In particular, empty containers should be identified, and the system should also be able to detect if there is a sample tube in a particular carrier unit receptacle, what type of sample tube is in a particular carrier unit receptacle, or what type of carrier unit it is. It can also be helpful to recognize certain features of a carrier unit. It is also important to know whether there is foam on the surface of the liquid.

Therefore, there is a need for tools that allow easy (and therefore cost-effective) and reliable determination of foam in liquid containers in automated liquid processing systems, thus enabling more efficient processing of large quantities of samples and reagents.

SUMMARY OF THE INVENTION

It is an object of the present invention to provide devices for foam detection in liquid containers, with the help of which it is possible to detect quickly and reliably whether there is foam in the liquid container already when a liquid container is provided for the subsequent processing by the liquid handling robot. This object is fulfilled by the device according to claim 1 and the alternative device according to claim 10.

In addition, it is an object of the present invention to provide appropriate methods for foam detection, which make it possible to detect quickly and reliably whether there is foam in the liquid container already during the provision of a liquid container for the subsequent processing by the liquid handling robot. According to the invention, this object is solved by the method proposed in claim 7 and the alternative method indicated in claim 13.

Specific embodiments according to the invention are specified in the dependent claims.

A device according to the invention for capacitive foam detection in liquid containers, in particular containers (such as troughs or vials) for reagents or sample tubes, comprises:
- a sensor having a measurement electrode;
- a conductive bottom plate suitable for arranging at least one liquid container or a carrier unit having at least one receptacle for receiving a liquid container, in particular a sample tube;
- a sensor electronic unit which is connected to the measurement electrode and the bottom plate and is adapted to determine an impedance, in particular a capacitance (i.e. the imaginary part of the complex-valued impedance), between the measurement electrode and the bottom plate; and
- an evaluation unit, wherein
- the measurement electrode is arranged substantially perpendicularly to the bottom plate, in particular vertically to the horizontally arranged bottom plate;
- the sensor electronic unit comprises a signal generator with which a first signal for exciting the measurement electrode at a first frequency and a second signal for exciting the measurement electrode at a second frequency can be generated; and
- the evaluation unit is adapted to detect, based on the impedance, in particular the capacitance, a presence of foam in the liquid container if a difference between a first measurement signal when the measurement electrode is excited with the first signal and a second measurement signal when the measurement electrode is excited with the second signal or a ratio (quotient) of the first and second measurement signals exceeds a predetermined threshold value. The evaluation unit can be a microprocessor with associated software.

In an embodiment of the device, the measurement electrode comprises several sub-electrodes, which are arranged vertically one above the other, and of which in each case a single or simultaneously several can be selectively connected to the sensor electronic unit, in particular the signal generator.

In another embodiment of the device, the measurement electrode is arranged on the front side of a sensor carrier above a guard electrode, wherein the guard electrode is located in particular between the measurement electrode and the bottom plate.

In another embodiment of the device, the measurement electrode is arranged on a front side of a sensor carrier between a first and a second guard electrode.

In another embodiment of the device, a third guard electrode is arranged on a rear side or an intermediate layer of the sensor carrier, wherein the third guard electrode (is electrically insulated from the measurement electrode and the first and second guard electrodes and) covers at least the measurement electrode (from behind), in particular covers the measurement electrode and the first and second guard electrodes.

In another embodiment of the device, the measurement electrode and the first and second guard electrode are arranged between a first and a second ground electrode, wherein the first and second ground electrode are in turn arranged between a fourth and fifth guard electrode, wherein the first and second ground electrode are electrically connected to the bottom plate.

In another embodiment of the device, the measurement electrode, any guard electrodes and any ground electrodes are designed in the form of strips and are aligned vertically and, in particular, parallel to a longitudinal axis of the liquid container, in particular of the sample tube, during operation of the device.

In another embodiment of the device, the measurement electrode has a width in the range of 80% to 100% of the diameter of the liquid container, in particular the sample tube, and the first and second guard electrode in particular each have a width of over 100% of the diameter of the liquid container, in particular the sample tube. The sample tubes are typically between 8 and 16 mm wide.

In another embodiment of the device, the first frequency is in a range from 1 kHz to 1 MHz, in particular in a range from 300 kHz to 500 kHz, and the second frequency is in a range from 1 MHz to 50 MHz, in particular in a range from 10 MHz to 15 MHz, wherein both the first and the second frequency can be set differently in particular.

In another embodiment of the device, the first and second signals are sinusoidal signals at the first and second frequency.

In another embodiment of the device, the signal for exciting the measurement electrode is also used for exciting the guard electrodes, wherein the signal for exciting the guard electrodes is of low impedance and is generated from the signal for exciting the measurement electrode, in particular with a buffer amplifier with voltage amplification 1.

In another embodiment of the device, the sensor carrier is designed as a printed circuit board, especially as a multilayer printed circuit board.

In another embodiment of the device, the sensor electronic unit is accommodated on the same printed circuit board as the sensor, wherein the printed circuit board has at least two intermediate layers between the front and the rear, wherein the measurement electrode and any first and second guard electrode and any first and second ground electrode and any fourth and fifth guard electrode are located on the front side of the circuit board, the possible third guard electrode is located on a first intermediate layer behind the front side, a ground surface as a shield is located on a second intermediate layer behind the first intermediate layer, wherein the shield is electrically connected to the possible first and second ground electrode, and conductor tracks for signal conduction of the sensor electronic unit are located on the rear side and possibly one or more further intermediate layers between the rear side and the ground surface.

In another embodiment of the device, the evaluation unit is further adapted to recognize at least one of the following list based on the impedance, in particular the capacitance:
- a filling level of the liquid container, in particular of the sample tube, in particular whether the liquid container, in particular the sample tube, is empty and/or exceeds a predetermined filling level;
- whether there is a liquid container, in particular a sample tube, in the at least one receptacle;
- different carrier units, e.g. carrier units for liquid containers of different sizes, especially sample tubes;
- different features on a carrier unit, e.g. individual receptacles, especially subdivisions between receptacles.

An alternative solution for a device according to the invention for capacitive foam detection in liquid containers, in particular containers (such as troughs or vials) for reagents or sample tubes, comprises:
- a sensor having a measurement electrode, which is arranged coplanar on a horizontal bottom plate or integrated in the bottom plate;
- an at least partially conductive carrier unit having at least one receptacle for accommodating a liquid container, wherein the carrier unit is in particular grounded, for example capacitively coupled to an earth potential;
- a sensor electronic unit which is connected to the measurement electrode and the carrier unit and is adapted to determine an impedance, in particular a capacitance, between the measurement electrode and the carrier unit; and
- an evaluation unit, wherein
- the carrier unit is arranged on the bottom plate in such a way that the receptacle lies above or on the measurement electrode, and the carrier unit is electrically insulated from the measurement electrode;
- the sensor electronic unit comprises a signal generator with which a first signal for exciting the measurement electrode at a first frequency and a second signal for exciting the measurement electrode at a second frequency can be generated; and
- the evaluation unit is adapted to detect, based on the impedance, in particular the capacitance, a presence of foam in the liquid container if a difference between a first measurement signal when the measurement electrode is excited with the first signal and a second measurement signal when the measurement electrode is excited with the second signal or a ratio (quotient) of the first and second measurement signals exceeds a predetermined threshold value.

In an embodiment of the alternative device, the carrier unit is conductive in the area of the at least one receptacle, e.g. in an area of the wall of the receptacle, and has in particular a (counter) electrode (to the measurement electrode).

In another embodiment of the alternative device, the measurement electrode is arranged on or in a sensor carrier and surrounded by a guard electrode, wherein the measurement electrode is in particular round and the guard electrode is in particular ring-shaped. The measurement electrode and the guard electrode are in particular arranged together on a lower side or an upper side or an intermediate layer of the sensor carrier.

In another embodiment of the alternative device, a further guard electrode is arranged on or in the sensor carrier below the measurement electrode and the guard electrode, wherein the further guard electrode (is electrically insulated from the measurement electrode as well as the guard electrode and) covers at least the measurement electrode (from below), in particular covers the measurement electrode as well as the guard electrode, wherein the further guard electrode is in particular circular. The further guard electrode can, for example, be arranged on the lower side of the sensor carrier, while the measurement electrode and the guard electrode are arranged together on an upper side or an intermediate layer of the sensor carrier.

In another embodiment of the alternative device, the measurement electrode has the same shape and the same size as the largest horizontal cross-section of the liquid container, in particular at most the same size as the largest horizontal cross-section of the liquid container.

In another embodiment of the alternative device, the receptacle is adapted to accommodate at least 40% of the liquid container, and in particular has a depth that corresponds to at least 40% of a height of the liquid container.

In another embodiment of the alternative device, during operation of the device, a vertical longitudinal axis of the liquid container, which is located in the receptacle, is aligned perpendicularly to the measurement electrode, and in particular pierces a center of the measurement electrode or pierces the measurement electrode in a circumference of the center with a radius of up to 10% of a maximum extension of the measurement electrode.

In another embodiment of the alternative device, the liquid container, which is located in the receptacle, is arranged above or on the measurement electrode during operation of the device.

In another embodiment of the alternative device, the receptacle has a feed-through in a bottom area of the carrier unit or a bottom area of the carrier unit is made of a non-conductive material so that the bottom area is not grounded.

In another embodiment of the alternative device, at least one non-conductive spacer is arranged in a lateral region of the receptacle, wherein the spacer is designed in particular as a spacer sleeve which partially or completely encloses the liquid container vertically.

In another embodiment of the alternative device, the sensor is connected to the carrier unit, in particular fixed to a bottom of the carrier unit.

In another embodiment of the alternative device, the first frequency is in a range from 1 kHz to 1 MHz, in particular in a range from 300 kHz to 500 kHz, and the second frequency is in a range from 1 MHz to 50 MHz, in particular in a range from 10 MHz to 15 MHz, wherein both the first and the second frequency can be set differently in particular.

In another embodiment of the alternative device, the first and second signals are sinusoidal signals at the first and second frequency.

In another embodiment of the alternative device, the signal for exciting the measurement electrode is also used for exciting the guard electrodes, wherein the signal for exciting the guard electrodes is of low impedance and is generated from the signal for exciting the measurement electrode, in particular with a buffer amplifier with voltage amplification 1.

In another embodiment of the alternative device, the guard electrode can be connected by means of a switch either to the low-resistance signal for exciting the guard electrode or to a ground potential, i.e. the guard electrode can also be grounded, for example to determine the thickness of a bottom of the liquid container.

In another embodiment of the alternative device, the sensor carrier is designed as a printed circuit board, especially as a multi-layer printed circuit board.

In another embodiment of the alternative device, the evaluation unit is further adapted to recognize at least one of the following list based on the impedance, in particular the capacitance:
  a filling level of the liquid container, in particular whether the liquid container is empty and/or exceeds a specified filling level;
  whether there is a liquid container in the at least one receptacle;
  different carrier units, e.g. carrier units for different sized liquid containers;
  different features on a carrier unit, e.g. type of spacer.

According to another aspect of the present invention, a method for capacitive foam detection in liquid containers, in particular containers for reagents or sample tubes, comprises the steps of:

providing a conductive bottom plate, which is arranged horizontally, and a sensor with a measurement electrode, which is arranged vertically, and a sensor electronic unit, which is connected to the measurement electrode and the bottom plate;

arranging a liquid container or a carrier unit having at least one receptacle for accommodating a liquid container, in particular a sample tube, on the bottom plate next to the measurement electrode;

exciting the measurement electrode with a first signal at a first frequency, especially in a range from 1 kHz to 1 MHz, preferably in a range from 300 kHz to 500 kHz;

determining a first measurement signal depending on an impedance, in particular a capacitance, between the measurement electrode and the bottom plate;

exciting the measurement electrode or a second measurement electrode connected to the sensor electronic unit and the bottom plate with a second signal at a second frequency, in particular in a range from 1 MHz to 50 MHz, preferably in a range from 10 MHz to 15 MHz;

determining a second measurement signal depending on the impedance, in particular the capacitance, between the measurement electrode or the second measurement electrode and the bottom plate; and outputting an identifier that signals the presence of foam in the liquid container if a difference between the first and second measurement signal or a ratio (quotient) of the first and second measurement signal exceeds a predefined threshold.

In this process, the first and second signal for exciting the measurement electrode can be generated simultaneously at the first and second frequency (e.g. as a signal with frequency components at the first and second frequency) and applied to the measurement electrode (or the first and second signal can be generated one after the other and applied to the measurement electrode). Alternatively, it is also possible to excite the measurement electrode simultaneously with the first signal and to excite an (independent) second measurement electrode with the second signal, which is locally separated from the (first) measurement electrode and, for example, is arranged (geometrically) parallel to the (first) measurement electrode. It should be noted that the first and second signal must not only have signal components (exactly) at the first and second frequency, but may also include, in addition to these signal components at the first and second frequency, additional signal components at other frequencies near or in a frequency range around the first and second frequency.

In an embodiment of the method, the first and the second signal for exciting the measurement electrode are applied to the measurement electrode simultaneously, and the first and second measurement signal are determined simultaneously.

In an embodiment the method includes a further step of:
  moving a carrier unit having a plurality of receptacles for accommodating sample tubes in a horizontal direction past the measurement electrode,
  wherein the determination of the measurement signal is carried out while moving the carrier unit past the measurement electrode.

In another embodiment of the method, the measurement electrode comprises several sub-electrodes which are arranged one above the other in the vertical direction, and exciting the measurement electrode with the first and second signal comprises selecting at least one sub-electrode and exciting only the at least one selected sub-electrode.

An alternative solution for a method according to the invention for capacitive foam detection in liquid containers, in particular containers for reagents or sample tubes, comprises the steps of:
- arranging a sensor having a measurement electrode on a horizontal bottom plate, wherein the measurement electrode is arranged coplanar on the bottom plate or integrated in the bottom plate;
- arranging an at least partially conductive carrier unit having at least one receptacle for receiving a liquid container above or on the measurement electrode, wherein the carrier unit is in particular grounded, for example capacitively coupled to a ground potential, and is electrically insulated from the measurement electrode;
- arranging a liquid container in the receptacle;
- providing a sensor electronic unit, which is connected to the measurement electrode and the carrier unit;
- exciting the measurement electrode with a first signal at a first frequency, especially in a range from 1 kHz to 1 MHz, preferably in a range from 300 kHz to 500 kHz;
- determining a first measurement signal depending on an impedance, in particular a capacitance, between the measurement electrode and the carrier unit;
- exciting the measurement electrode or a second measurement electrode, which is connected to the sensor electronic unit and the carrier unit, with a second signal at a second frequency, in particular in a range from 1 MHz to 50 MHz, preferably in a range from 10 MHz to 15 MHz, wherein both the first and the second frequency can in particular be set differently;
- determining a second measurement signal depending on the impedance, in particular the capacitance, between the measurement electrode or the second measurement electrode and the carrier unit; and
- outputting an identifier that signals the presence of foam in the liquid container if a difference between the first measurement signal and the second measurement signal or a ratio (quotient) of the first and second measurement signal exceeds a predefined threshold.

In this process, the first and second signal for exciting the measurement electrode can be generated simultaneously at the first and second frequency (e.g. as a signal with frequency components at the first and second frequency) and applied to the measurement electrode (or the first and second signal can be generated one after the other and applied to the measurement electrode). Alternatively, it is also possible to excite the measurement electrode simultaneously with the first signal and to excite an (independent) second measurement electrode with the second signal, which is locally separated from the (first) measurement electrode and is, for example, arranged next to the (first) measurement electrode. It should be noted that the first and second signal must not only have signal components (exactly) at the first and second frequency, but may also include, in addition to these signal components at the first and second frequency, additional signal components at other frequencies near or in a frequency range around the first and second frequency.

In an embodiment of the alternative method, the first and the second signal for exciting the measurement electrode are applied to the measurement electrode simultaneously, and the first and second measurement signal are determined simultaneously.

According to another aspect of the present invention, the proposed methods can also be used to determine a type of liquid, in particular a type of reagent, which is contained in the liquid container.

BRIEF DESCRIPTION OF THE DRAWINGS

Non-limiting exemplary embodiments of the present invention are explained in more detail below using figures, wherein:

FIG. 1 a) schematically shows in a side view an embodiment of a device for capacitive foam detection according to the invention, FIG. 1 b) schematically shows in a side view a further embodiment of a device for capacitive foam detection according to the invention;

FIG. 2 a) schematically shows in a side view a carrier unit having several sample tubes, FIG. 2 b) schematically shows in a view from above an embodiment of a device according to the invention for capacitive foam detection in the sample tubes according to FIG. 2 a), FIG. 2 c) shows a schematic representation including an indication of the electrical equivalent circuit of the embodiment according to FIGS. 2 a) & b);

FIG. 3 a) shows a further embodiment of a sensor according to the invention,

FIG. 3 b) shows a view of the front side (left) as well as the intermediate layer and the ground surface (right) of the sensor according to FIG. 3 a), FIG. 3 c) shows a side profile of the sensor according to FIGS. 3 a) & b) with the front side, the intermediate layer and behind it the layer with the ground surface;

FIG. 5 a) schematically shows a lateral cross-section of a liquid container in a carrier unit on a sensor according to an alternative embodiment of the invention, FIG. 5 b) schematically shows in a view from above the embodiment according to FIG. 5 a), FIG. 5 c) shows the electrical equivalent circuit of the embodiment according to FIGS. 5 a) & b);

FIG. 6 a) shows a top view of an alternative embodiment of a sensor according to the invention, and FIG. 6 b) shows a cross-section of the sensor according to FIG. 6 a).

In the figures the same reference numerals stand for the same elements.

DETAILED DESCRIPTION OF THE INVENTION

Figure 1:
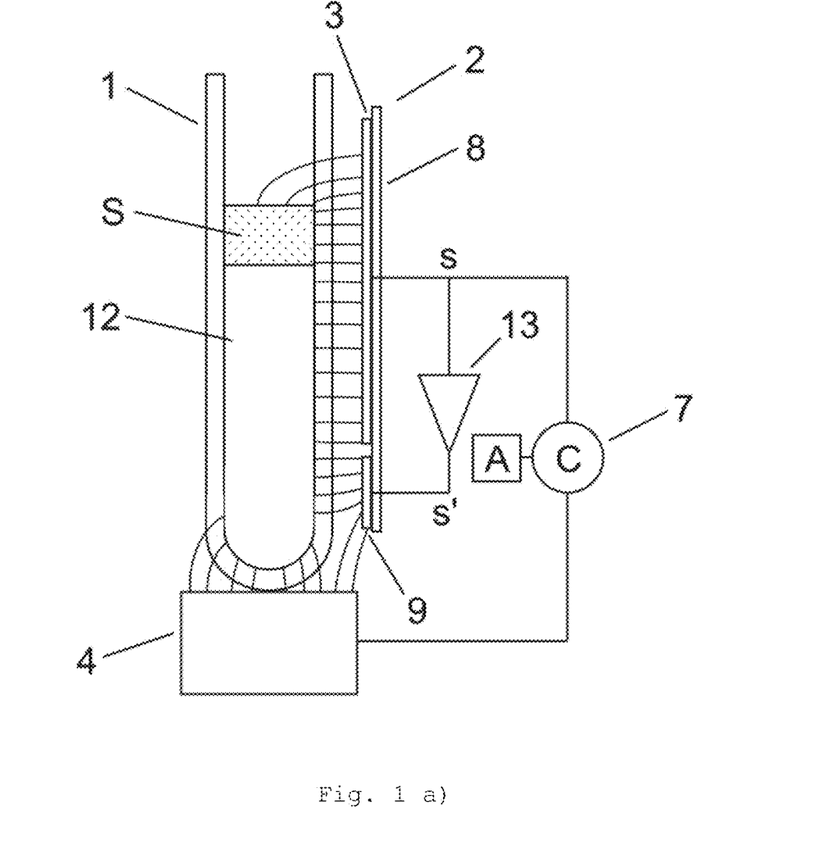

FIG. 1 a) shows schematically in a side view an exemplary embodiment of an arrangement for capacitive foam detection according to the invention. For this purpose, a liquid container, here a sample tube 1, is placed above a conductive, horizontal bottom plate (or working surface) 4 and next to a sensor 2 having a measurement electrode 3. The measurement electrode 3 and the bottom plate 4 are connected to a sensor electronic unit 7, which is adapted to determine the impedance, in particular the capacitance (i.e. the imaginary part of the complex-valued impedance), between the measurement electrode 3 and the bottom plate 4. Typically, the bottom plate 4 is grounded or is at a reference potential. To measure the capacitance, the measurement electrode 3 is excited with a signal s, which is generated by a signal generator in the sensor electronic unit 7. Due to the signal s, an electric field is formed between the measurement electrode 3 and the bottom plate 4, wherein the field lines are passed through the liquid 12. Depending on the amount of liquid 12 in the sample tube 1, i.e. depending on the filling level, the measured capacitance changes.

The present invention is based on the finding that, when the measurement electrode 3 is excited at a low frequency, e.g. in the range of 1 kHz to 1 MHz, foam S, which is located on the surface of liquid 12, increases the measured capacitance (compared to the same measurement when no foam S is present) and is thus included with respect to the filling level. On the other hand, if the measurement electrode 3 is excited with a high frequency, e.g. in the range of 10 MHz to 15 MHz (i.e. with a frequency that is higher by a factor of 10 to 100, for example), the foam S will hardly affect the measured capacitance any more and is therefore negligible with regard to the filling level. Consequently, at a low excitation frequency the foam S appears as part of the liquid 12 and at a high excitation frequency the foam S no longer appears as part of the liquid, so the filling level measured at the low frequency is higher than the filling level measured at the high frequency. Consequently, at least the presence of foam S can be detected e.g. based on a comparison of the two measured filling levels. It should be noted, however, that typically even if no foam is present, at the same effective filling level the two filling levels measured at different frequencies based on the measured capacitance will not be identical. The difference depends on the impedance spectrum of the liquid, i.e. on its frequency-dependent impedance, or its frequency-dependent permittivity (also called dielectric conductivity). Different liquids, such as reagents, have different characteristic impedance spectra. By measuring and comparing the capacitance between the measurement electrode 3 and the bottom plate 4 when the measurement electrode 3 is excited with a signal s with a low and a high frequency, it is therefore possible to detect foam as well as to determine the type of liquid 12. For example, water, which is strongly polar, can be clearly distinguished from ethanol, which is less polar.

FIG. 1 b) illustrates a further embodiment of the device, wherein the measurement electrode here consists of several sub-electrodes 31, 32, 33, which are arranged one above the other in the vertical direction, and of which in each case a single or simultaneously several can be selectively connected to the sensor electronic unit 7, in particular the signal generator and the evaluation unit A. In FIG. 1 b), the lowest sub-electrode 33 is not connected (i.e. not selected) to the sensor electronic unit 7. This causes the electric field to be focused specifically in the area with foam S, thus increasing the sensitivity of the foam detection. The individual sub-electrodes 31, 32, 33 can be connected sequentially to the sensor electronic unit 7, e.g. via a multiplexer MUX. Depending on the filling level, e.g. only the uppermost sub-electrode 31 or the middle sub-electrode 32 or both (as shown in FIG. 1 b)) are connected to the sensor electronic unit 7. Such an arrangement minimizes the influence of the liquid (e.g. its conductivity) on the one hand and maximizes the sensitivity for foam detection on the other hand.

Optionally, the sensor 2 can include a guard electrode 9 in addition to the measurement electrode 3, which is arranged on a sensor carrier 8 together with the measurement electrode 3. The guard electrode 9 is excited with a low-impedance signal s', which can be generated by applying the signal s to a buffer amplifier 13 with voltage amplification 1. By means of the guard electrode 9 the electric field can be focused in a desired way, ensuring that the field lines from the measurement electrode 3 are guided through the liquid 12 and not directly into the bottom plate 4, which increases the accuracy of the filling level measurement.

The sensor 2 shown in FIGS. 1 a) and 1 b) is well suited if in each case only a single liquid container, e.g. a trough or vial with a reagent or cleaning agent, is placed in front of the described electrode arrangement in order to determine its filling level or to detect foam S. If, on the other hand, several liquid containers arranged close to each other, such as a large number of sample tubes 1 in a carrier unit (rack) 5, are passed together past the sensor 2, a part of the field lines from the measurement electrode 3 is passed through the liquid 12' of the adjacent sample tubes 1', whereby the measurement of the filling level of the desired sample tube 1 can be distorted by the filling level of the adjacent sample tubes 1'. The foam detection is also affected by this.

Figure 2:
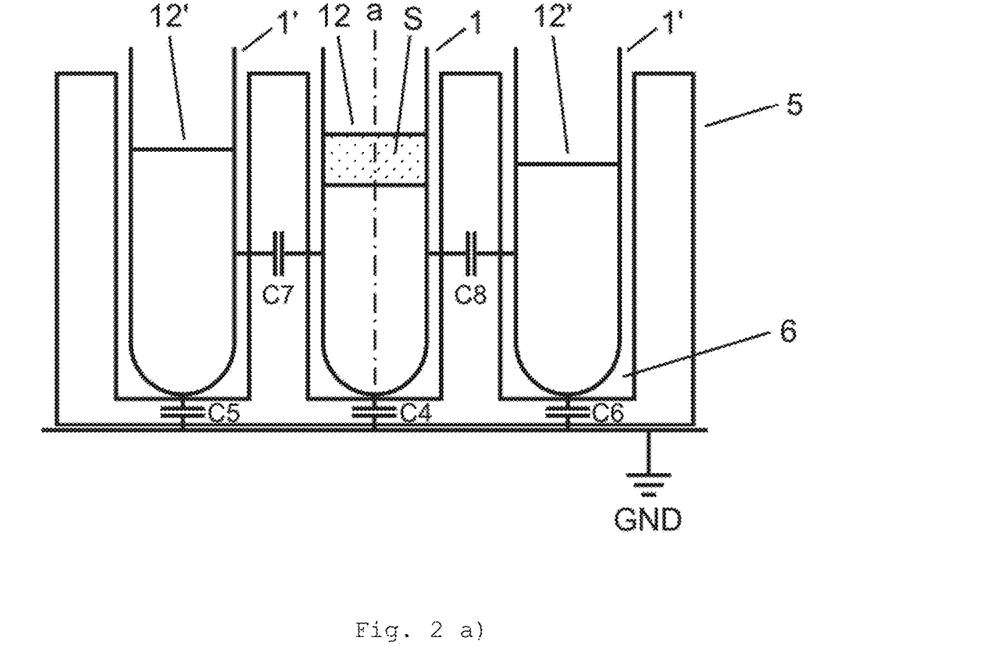

FIGS. 2 a), 2 b) and 2 c) show an embodiment of a sensor 2 according to the invention, which solves the problem described above by strongly reducing the "crosstalk" caused by adjacent sample tubes 1'.

FIG. 2 a) shows schematically in a side view a carrier unit 5 having several sample tubes 1, which all contain liquid 12, 12'. The sensor 2 is not visible in this illustration, but is located in front of the three sample tubes 1, 1' whose longitudinal axis a is perpendicular to the horizontal bottom plate 4. In FIG. 2 b) this arrangement is shown from above, here with the sensor 2. As indicated, the measurement electrode 3 of this sensor 2 is located between two guard electrodes 91, 92, which are arranged on the left and right of the measurement electrode 3. The measurement electrode 3 as well as the two guard electrodes 91, 92 are arranged on the front side V of a printed circuit board, which serves as sensor carrier 8. On the rear side H of the sensor carrier 8 a further guard electrode 93 is arranged, which covers both the measurement electrode 3 and the two front guard electrodes 91, 92 from the rear. This electrode arrangement creates an electric field, which on the one hand couples the measurement electrode 3 to the liquid 12 in the sample tube 1 in front of it (indicated by the capacitance C1) and couples the two lateral guard electrodes 91, 92 to the liquid 12' in the sample tubes 1' in front of them (indicated by the capacitances C2 & C3) and on the other hand couples the liquid 12, 12' in the three sample tubes 1, 1' to the grounded bottom plate 4 (indicated by the capacitances C4, C5 & C6). Despite the guard electrodes 91, 92, a small part of the electric field from the liquid 12' in the two side sample tubes 1' is still scattered into the liquid 12 in the middle sample tube 1, whose filling level is to be measured or the presence of foam S is to be detected therein (indicated by the capacitances C7 & C8). However, the capacitances C7 & C8 are comparatively small compared to the capacitances C1+C4.

FIG. 2 c) shows a schematic representation including an indication of the electrical equivalent circuit of the embodiment according to FIGS. 2 a) & b) with the sensor electronic unit 7, which contains a signal generator that supplies the signal s for exciting the measurement electrode 3, as well as the buffer amplifier 13 with amplification 1, which supplies this signal s as a low-impedance signal s' to the two guard electrodes 91, 92.

Figure 3:
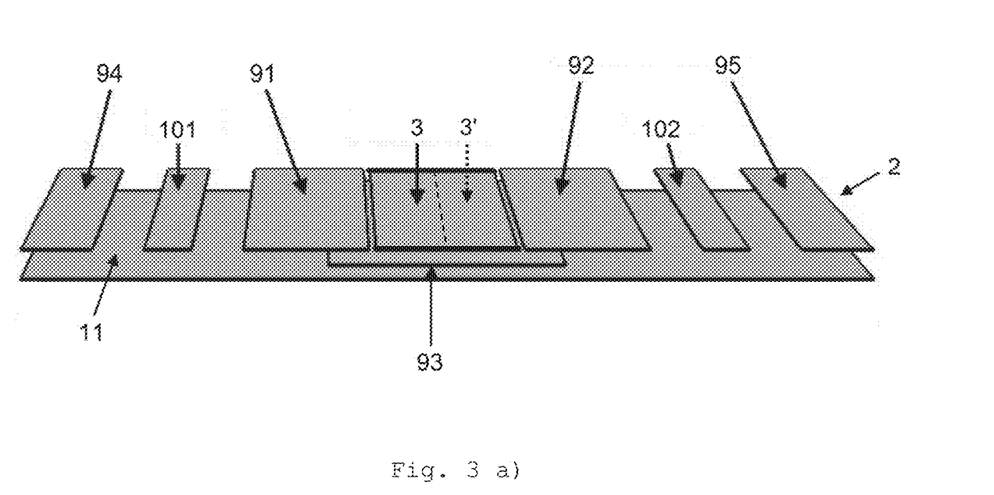

In order to further reduce the "crosstalk" or coupling of the sample tubes 1, 1' (or the liquids 12, 12' disposed in them), the embodiment illustrated in FIGS. 3 a), 3 b) and 3 c) is proposed.

FIG. 3 a) shows a striped section of sensor 2 in a perspective view. In this embodiment variant, an additional ground electrode 101, 102 and a further guard electrode 94, 95 are arranged on the front side V of the sensor carrier 8 to the left and right of the measurement electrode 3 and the two guard electrodes 91, 92. Due to the shown arrangement of the two lateral ground electrodes 101, 102, 1, 1', zeroes are generated in the electric field between the three sample tubes. The dashed line on the measurement electrode 3 in FIG. 3 *a*) indicates that a second, independent (i.e. electrically separated) measurement electrode 3' can be used in addition to the (first) measurement electrode 3, wherein the second measurement electrode 3' is excited e.g. with a different frequency than the first measurement electrode 3.

In the illustration of FIG. 3 *b*) the complete front side V of the sensor carrier 8 is shown in a view from the front on the left side with the left outer guard electrode 94, the left ground electrode 101, the left inner guard electrode 91, the measurement electrode 3, the right inner guard electrode 92, the right ground electrode 102 as well as the right outer guard electrode 95, which are all designed in a strip-shaped manner, in the middle the intermediate layer Z with the guard electrode 93, and on the right side the rear side H with the ground surface 11. The length of the electrode strips corresponds approximately to the height of the sample tubes 1. As a detail, it should be noted that at the lower end of the measurement electrode 3 there is still a piece of guard electrode 9, as shown in FIGS. 1 *a*) and 1 *b*) to ensure that the field lines of the electric field from the measurement electrode 3 reach the bottom plate 4 via the liquid 12 in the sample tube 1 and do not run directly from the measurement electrode 3 to the bottom plate 4 and bypass the liquid 12 in the sample tube 1, which would falsify the filling level measurement or foam detection and thus make it inaccurate or unreliable.

FIG. 3 *c*) also shows a side profile (rotated 90 degrees to the horizontal) of the multi-layer sensor carrier 2, which is designed, for example, as a multi-layer printed circuit board, with the front side V with the seven strip-shaped electrodes 94, 101, 91, 3, 92, 102 & 95, the intermediate layer Z with the wide strip-shaped guard electrode 93 and the rear side H with the even wider ground surface 11, which covers all electrode strips in front of it from behind.

Figure 4:
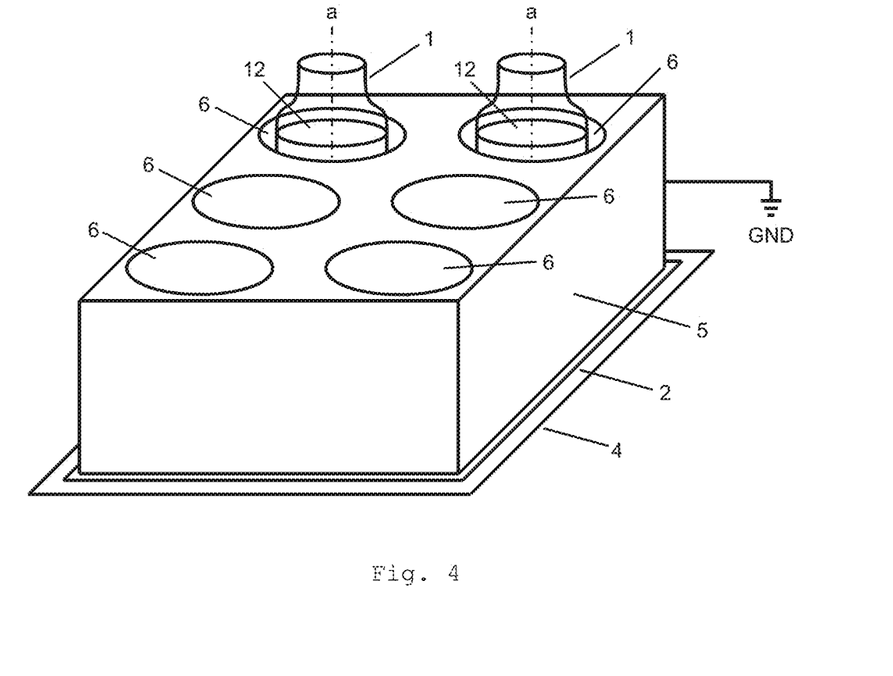
FIG. 4 schematically shows in a perspective view an embodiment of an alternative device for capacitive foam detection according to the invention.
Figure 5:
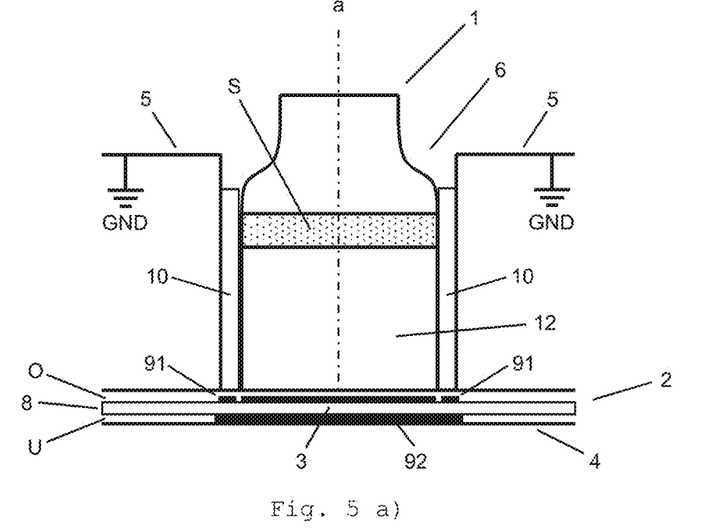

FIG. 4 illustrates schematically in a perspective view an alternative embodiment of a device according to the invention for capacitive foam detection. A conductive carrier unit 5 having six receptacles 6 for holding liquid containers 1, wherein only the two rear receptacles 6 contain liquid containers 1 with a liquid 12 such as a reagent, is arranged on a horizontal bottom plate 4. A sensor 2 with a measurement electrode 3 is located between the bottom plate 4 and the carrier unit 5. The longitudinal axes a of the two liquid containers 1 are aligned vertically, i.e. perpendicularly to the sensor 2. The carrier unit 5 is grounded or capacitively coupled to ground potential GND. The measurement electrode 3 is electrically insulated from the carrier unit 5. The measurement electrode 3 and the carrier unit 5 are connected to a sensor electronic unit (see 7 in FIG. 5 *c*)) to determine the capacitance between the measurement electrode 3 and the carrier unit 5.

Analogous to the embodiment according to FIG. 1 *b*), both foam S can be detected and the type of liquid 12 can be determined by measuring and comparing the capacitance between the measurement electrode 3 and the carrier unit 5 when the measurement electrode 3 is excited with a signal s with a low and a high frequency.

Figure 6:
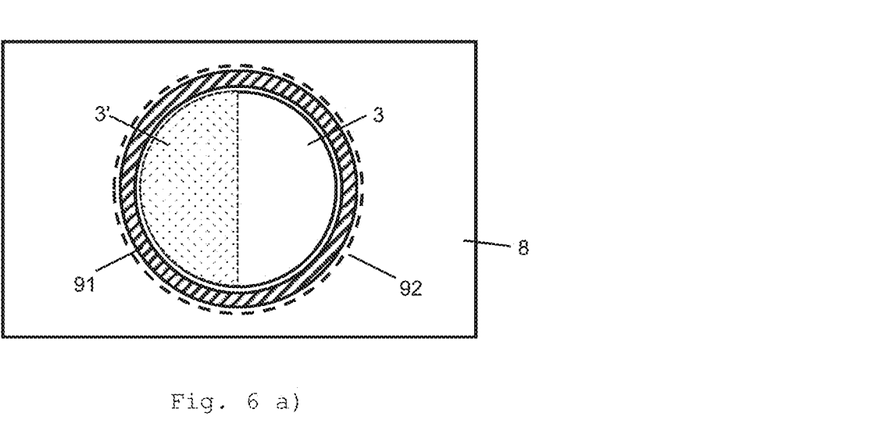

FIG. 5 *a*) schematically shows a lateral cross-section of a liquid container 1 in a carrier unit 6 on a sensor 2 according to an embodiment of the invention. In this embodiment variant, the sensor 2 consists of a round measurement electrode 3, a first, ring-shaped guard electrode 91 and a second, round guard electrode 92, with the measurement electrode 3 being surrounded in this case by the ring-shaped guard electrode 91. Both are located on the upper side O of a sensor carrier 8, for example a printed circuit board. The second guard electrode 92 is located on the bottom side U of the sensor carrier 8 and covers both the measurement electrode 3 and the guard electrode 91 from below (i.e. behind or below the measurement electrode 3 and the guard electrode 91 as seen from the carrier unit 5). The sensor carrier 8 lies on the bottom plate 4, wherein the carrier unit 5 is arranged above the sensor 2 in such a way that the receptacle 6 is located above the measurement electrode 3. Ideally, the longitudinal axis a of the liquid container 1, which is located in the receptacle 6, pierces the center of the circular measurement electrode 3. The grounded carrier unit 5 must be electrically insulated from the sensor 2. To ensure this, there is an insulating layer on the surface O of the sensor carrier 8 (not shown in FIG. 5 *a*); see FIG. 6 *b*) in this respect). Furthermore, a non-conductive spacer 10 can be arranged in the lateral area or on the wall of the receptacle 6, wherein the spacer 10 is designed, for example, as a spacer sleeve that partially or completely encloses the liquid container 1 vertically. Such a spacer sleeve (or insulation sleeve/ring) 10 that completely encloses the liquid container 1 vertically is shown in FIG. 6 *b*), which shows the embodiment according to FIG. 6 *a*) in a top view. The insulation ring 10 has two positive effects. On the one hand, tolerances/deviations of the outer diameter of a liquid container 1 and the inner diameter of a receptacle 6 as well as the position of the liquid container 1 within the receptacle 6 have a less strong effect on the measurement results. On the other hand, the insulation ring 10 prevents condensed moisture on the outside of a cooled liquid container 1 (such as a reagent container) from making galvanic contact with the carrier unit 5 and thus falsifying the measurements.

FIG. 5 *c*) represents an electrical equivalent circuit of the embodiment according to FIGS. 5 *a*) & *b*). The carrier unit 5 and the measurement electrode 3 arranged at a right angle thereto together form a capacitor whose capacitance depends on the filling level of liquid 12 in the liquid container 1 (i.e. the higher the filling level, the greater the capacitance). The capacitance is made up of two partial capacitances C21 and C22, wherein C21 is the capacitance between the carrier unit 5 and liquid 12 and C22 is the capacitance between liquid 12 and the measurement electrode 3. C21 changes linearly with the filling level in a cylindrical liquid container 1. C22, on the other hand, remains constant from a certain minimum filling quantity with a minimum conductivity of liquid 12 and with a flat bottom of liquid container 1, regardless of the filling level. To measure the capacitance, the measurement electrode 3 is excited with a signal s, which is generated by a signal generator in the sensor electronic unit 7. Due to the signal s, an electric field is formed between the carrier unit 5 and the measurement electrode 3, wherein the field lines run through the liquid 12. Depending on the quantity of liquid 12, which is in the liquid container 1, i.e. depending on the filling level, a certain, measurable capacitance results. By means of the first guard electrode 91, the electric field can be focused in a desired way, thus ensuring that the predominant part of the electric field is conducted from the carrier unit 5 through the liquid 12 into the measurement electrode 3 and, especially in the lowest area of the receptacle 6, is not conducted directly from the carrier unit 5 into the measurement electrode 3, thus increasing the accuracy of the filling level measurement. The second guard electrode 92 also serves to minimize edge effects and external disturbances and thus to reduce the parasitic capacitance. The two guard electrodes 91, 92 are excited with a low impedance signal s', which can be generated by applying the signal s to a buffer amplifier 13 with voltage amplification 1, as shown in FIG. 5 c). The guard electrode 91 can be connected via switch X either to the low impedance signal s' from buffer amplifier 13 or to the ground potential GND. If the guard electrode 91 is grounded, the thickness of the bottom of the liquid container 1 can be determined by measuring the capacitance C21+C23.

In FIG. 6 a) the sensor 2, which is suitable for filling level measurement or foam detection in a liquid container 1 located above, is shown in a top view. Here it can be clearly seen how the circular measurement electrode 3 is surrounded by the ring-shaped first guard electrode 91 (hatched in the drawing), wherein both are arranged coplanar on the sensor carrier 8. The second, circular guard electrode 92, which is located below the measurement electrode 3 and the first guard electrode 91 on the other side of the sensor carrier 8, is indicated by dashed lines. The second guard electrode 92 overlaps the first guard electrode 91 and covers the measurement electrode 3 as well as the first guard electrode 91 completely from below or behind. This is clearly visible in the cross-section of sensor 2 in FIG. 6 b). In the embodiment according to FIG. 6 b), the measurement electrode 3 and the first guard electrode 91 are applied to one side of an intermediate layer Z of the sensor carrier 8, and the second guard electrode 92 is applied to the other side of the intermediate layer Z. Both sides of the intermediate layer Z are each coated with a protective layer, for example of an electrically insulating material. These protective layers form the upper side O and the lower side U of the sensor 2. The dashed line on the measurement electrode 3 in FIG. 6 a) indicates that a second, independent (i.e. electrically separated, semicircular) measurement electrode 3' (shown in dotted line) can be used in addition to the (first, semicircular) measurement electrode 3, wherein the latter is excited, for example, with a different frequency than the first measurement electrode 3.

The sensor 2 can be arranged as a separate unit on the bottom plate 4 and e.g. glued on, or integrated in the bottom plate 4. Alternatively, the sensor 2 can also be attached to the carrier unit 5, so that the carrier unit 5 together with the sensor 2 forms a unit in which the sensor electronic unit 7 may also be integrated to provide a complete device for capacitive filling level measurement of liquid containers placed in the receptacle(s) 6 of the carrier unit 5. The sensor 2 can obviously have several measurement electrodes 3 with associated guard electrodes 91, 92, e.g. one per receptacle 6 in the carrier unit 5.

The carrier unit 5 need not be completely made of conductive material. For example, conductive electrodes can be used in the area of the receptacle(s) 6, which are grounded.

Instead of connecting the carrier unit 5 to ground potential GND (i.e. to ground it), the measurement electrode 3 can of course also be connected to ground potential in reverse, wherein this only determines where the reference potential for the capacitance measurement is located.

LIST OF REFERENCE SIGNS 1, 1' Liquid container, trough, sample tubes
2 Sensor
3 (First) measurement electrode
3' Second measurement electrode
31 First sub-electrode of the measurement electrode
32 Second sub-electrode of the measurement electrode
33 Third sub-electrode of the measurement electrode
4 Bottom plate
5 Carrier unit
6 Receptacle
7 Sensor electronic unit
8 Sensor carrier
9 Guard electrode
91 First guard electrode
92 Second guard electrode
93 Third guard electrode
94 Fourth guard electrode
95 Fifth guard electrode
101 First ground electrode
102 Second ground electrode
10 Spacer/sleeve, insulation ring
11 Ground surface
12, 12' Liquid
13 Buffer amplifier
A Evaluation unit
a Longitudinal axis of a sample tube
C1 . . . C8 (Partial) capacitance
C21 . . . C23 (Partial) capacitance
GND Ground, ground potential
H Rear side of the sensor carrier
K Identifier
MUX Multiplexer
O Top side of the sensor carrier
p Insertion path of the carrier unit
S Foam
s Signal to excite the measurement electrode
s' Signal to excite the guard electrodes
sc Control signal
U Lower side of the sensor carrier
Front side of the sensor carrier
X Switch
Z Intermediate layer of the sensor carrier

The invention claimed is:

1. A device for capacitive foam detection in liquid containers (1) comprising:
   a sensor (2) having a measurement electrode (3);
   a conductive bottom plate (4) suitable for arranging at least one liquid container (1) or a carrier unit (5) having at least one receptacle (6) for receiving a liquid container (1);
   a sensor electronic unit (7) which is connected to the measurement electrode (3) and the conductive bottom plate (4) and is adapted to determine an impedance, between the measurement electrode (3) and the conductive bottom plate (4); and
   an evaluation unit (A),
   wherein
   the measurement electrode (3) is arranged substantially perpendicularly to the conductive bottom plate (4), in particular is arranged vertically to the horizontally arranged conductive bottom plate (4);
   the sensor electronic unit (7) comprises a signal generator with which a first signal for exciting the measurement electrode (3) at a first frequency and a second signal for exciting the measurement electrode (3) at a second frequency can be generated; and
   the evaluation unit (A) is adapted to detect, based on the impedance, a presence of foam (S) in the liquid container (1) if a difference between a first measurement signal in the case of exciting the measurement electrode (3) with the first signal and a second measurement signal in the case of exciting the measurement electrode (3) with the second signal or a ratio of the first and second measurement signals exceeds a predetermined threshold value, characterized in that the measurement electrode (3) comprises a plurality of sub-electrodes (31, 32, 33) which are arranged one above the other in the vertical direction and of which simultaneously a plurality can be selectively connected to the sensor electronic unit (7).

2. The device according to claim 1, further comprising a multiplexer (MUX) with which the selected at least two sub-electrodes (31, 32, 33) can be connected to the sensor electronic unit (7).

3. The device according to claim 1, wherein the measurement electrode (3) is arranged on a front side (V) of a sensor carrier (8) above a guard electrode (9), wherein the guard electrode (9) is located in particular between the measurement electrode (3) and the conductive bottom plate (4).

4. The device according to claim 1, wherein the measurement electrode (3) is arranged on a front side (V) of a sensor carrier (8) between a first and a second guard electrode (91, 92).

5. The device according to claim 4, wherein a third guard electrode (93) is arranged on a rear side (H) or an intermediate layer (Z) of the sensor carrier (8), wherein the third guard electrode (93) covers at least the measurement electrode (3).

6. The device according to claim 1, wherein the first frequency lies in a range from 1 kHz to 1 MHz, and the second frequency lies in a range from 1 MHz to 50 MHz, wherein both the first and the second frequency are in particular differently adjustable, and wherein the first and second signals are in particular sinusoidal signals.

7. A method for capacitive foam detection in a liquid container (1) comprising the steps of:
providing a conductive bottom plate (4), which is arranged horizontally, and a sensor (2) having a measurement electrode (3), which is arranged vertically, and a sensor electronic unit (7), which is connected to the measurement electrode (3) and the conductive bottom plate (4);
arranging the liquid container (1) or a carrier unit (5) having at least one receptacle (6) for accommodating the liquid container (1) on the conductive bottom plate (4) next to the measurement electrode (3);
exciting the measurement electrode (3) with a first signal at a first frequency in particular in a range from 1 kHz to 1 MHz;
determining a first measurement signal depending on an impedance, between the measurement electrode (3) and the conductive bottom plate (4);
exciting the measurement electrode (3) or a second measurement electrode (3'), which is connected to the sensor electronic unit (7) and the conductive bottom plate (4), with a second signal at a second frequency, in particular in a range from 1 MHz to 50 MHz;
determining a second measurement signal depending on the impedance, between the measurement electrode (3) or the second measurement electrode (3') and the conductive bottom plate (4); and
outputting an identifier signaling the presence of foam (S) in the liquid container (1) if a difference between the first and second measurement signals or a ratio of the first and second measurement signals exceeds a predetermined threshold value,
characterized in that the measurement electrode (3) comprises a plurality of sub-electrodes (31, 32, 33) arranged one above the other in the vertical direction, and exciting the measurement electrode (3) with the first and second signals comprises selecting at least two sub-electrodes (31, 32, 33) and exciting only the at least two selected sub-electrodes (31, 32, 33).

8. The method according to claim 7, wherein the selection of the at least two sub-electrodes (31, 32, 33) is effected via a multiplexer (MUX) which connects the at least two selected sub-electrodes (31, 32, 33) to the sensor electronic unit (7).

9. The method according to claim 7, further comprising the step of:
moving a carrier unit (5) with a plurality of receptacles (6) for accommodating sample tubes (1) in a horizontal direction past the measurement electrode (3),
wherein the determination of the measurement signal is performed during the movement of the carrier unit (5) past the measurement electrode (3).

10. An alternative device for capacitive foam detection in liquid containers (1) comprising:
a sensor (2) having a measurement electrode (3), which is arranged coplanar on a horizontal bottom plate (4) or integrated in the horizontal bottom plate (4);
an at least partially conductive carrier unit (5) having at least one receptacle (6) for accommodating a liquid container (1), wherein the at least partially conductive carrier unit (5) is in particular grounded;
a sensor electronic unit (7) which is connected to the measurement electrode (3) and the at least partially conductive carrier unit (5) and is adapted to determine an impedance between the measurement electrode (3) and the at least partially conductive carrier unit (5); and
an evaluation unit (A),
wherein
the at least partially conducive carrier unit (5) is arranged on the horizontal bottom plate (4) in such a way that the receptacle (6) lies above or on the measurement electrode (3), and the at least partially conductive carrier unit (5) is electrically insulated from the measurement electrode (3);
the sensor electronic unit (7) comprises a signal generator with which a first signal for exciting the measurement electrode (3) at a first frequency and a second signal for exciting the measurement electrode (3) at a second frequency can be generated; and
the evaluation unit (A) is adapted to detect, based on the impedance a presence of foam (S) in the liquid container (1) if a difference between or a ratio of a first measurement signal in the case of exciting the measurement electrode (3) with the first signal and a second measurement signal in the case of exciting the measurement electrode (3) with the second signal exceeds a predetermined threshold value.

11. The device according to claim 10, wherein the measurement electrode (3) is arranged on or in a sensor carrier (8) and is surrounded by a guard electrode (91), wherein the measurement electrode (3) is in particular round and the guard electrode (91) is in particular ring-shaped.

12. The device according to claim 11, wherein a further guard electrode (92) is arranged on or in the sensor carrier (8) below the measurement electrode (3) and the guard electrode (91), wherein the further guard electrode (92) covers at least the measurement electrode (3), wherein the further guard electrode (92) is in particular circular.

13. An alternative method for capacitive foam detection in a liquid container (1) comprising the steps of:
arranging a sensor (2) having a measurement electrode (3) on a horizontal bottom plate (4), wherein the measurement electrode (3) is arranged coplanar on the horizontal bottom plate (4) or integrated in the horizontal bottom plate (4);

arranging an at least partially conductive carrier unit (5) having at least one receptacle (6) for accommodating the liquid container (1) above or on the measurement electrode (3), wherein the at least partially conductive carrier unit (5) is in particular grounded and is electrically insulated from the measurement electrode (3);

arranging a liquid container (1) in the receptacle (6);

providing a sensor electronic unit (7), which is connected to the measurement electrode (3) and the at least partially conductive carrier unit (5)

exciting the measurement electrode (3) with a first signal at a first frequency, especially in particular in a range from 1 kHz to 1 MHz;

determining a first measurement signal depending on an impedance between the measurement electrode (3) and the at least partially conductive carrier unit (5);

exciting the measurement electrode (3) or of a second measurement electrode (3'), which is connected to the sensor electronic unit (7) and the at least partially conductive carrier unit (5), with a second signal at a second frequency, in particular in a range from 1 MHz to 50 MHz wherein both the first and the second frequency are in particular differently adjustable;

determining a second measurement signal depending on the impedance between the measurement electrode (3) or the second measurement electrode (3') and the at least partially conductive carrier unit (5); and outputting an identifier signaling the presence of foam (S) in the liquid container (1) if a difference between the first and second measurement signals or a ratio of the first and second measurement signals exceeds a predetermined threshold value.

14. The method according to claim 7, wherein the first and second signals for exciting the measurement electrode (3) are applied to the measurement electrode (3) simultaneously, and the first and second measurement signals are determined simultaneously.

15. The method according to claim 7 to determine a type of liquid (12), which is contained in the liquid container (1).

16. The method according to claim 13, wherein the first and second signals for exciting the measurement electrode (3) are applied to the measurement electrode (3) simultaneously, and the first and second measurement signals are determined simultaneously.

17. The method according to claim 13 to determine a type of liquid (12) which is contained in the liquid container (1).

18. The device according to claim 1, adapted to focus an electric field specifically in an area with foam (S).

19. The method according to claim 7, further comprising the step of focusing an electric field specifically in an area with foam (S).

20. The device according to claim 1, wherein the liquid containers (1) are containers for reagents or sample tubes.

21. The device according to claim 1, wherein the impedance is a capacitance.

22. The device according to claim 1, wherein simultaneously a plurality of the sub-electrodes (31, 32, 33) can be selectively connected to the signal generator.

23. The device according to claim 5, wherein the third guard electrode (93) covers the measurement electrode (3) as well as the first and second guard electrode (91, 92).

24. The device according to claim 6, wherein the first frequency lies in a range from 300 kHz to 500 kHz and the second frequency lies in a range from 10 MHz to 15 MHz.

25. The device according to claim 10, wherein the at least partially conductive carrier unit (5) is capacitively coupled to a ground potential (GND).

* * * * *